H. BERRY.
Pitcher.

No. 222,444. Patented Dec. 9, 1879.

WITNESSES
Villette Anderson.
Frank J. Masi.

INVENTOR
Henry Berry
by E. W. Anderson
his ATTORNEY

UNITED STATES PATENT OFFICE.

HENRY BERRY, OF HUNTINGTON, ASSIGNOR TO THE DERBY SILVER COMPANY, OF DERBY, CONNECTICUT.

IMPROVEMENT IN PITCHERS.

Specification forming part of Letters Patent No. 222,444, dated December 9, 1879; application filed October 18, 1879.

*To all whom it may concern:*

Be it known that I, HENRY BERRY, of Huntington, in the county of Fairfield and State of Connecticut, have invented a new and valuable Improvement in Pitchers; and I do hereby declare that the following is a full, clear, and exact description of the construction and operation of the same, reference being had to the annexed drawings, making a part of this specification, and to the letters and figures of reference marked thereon.

Figure 1:
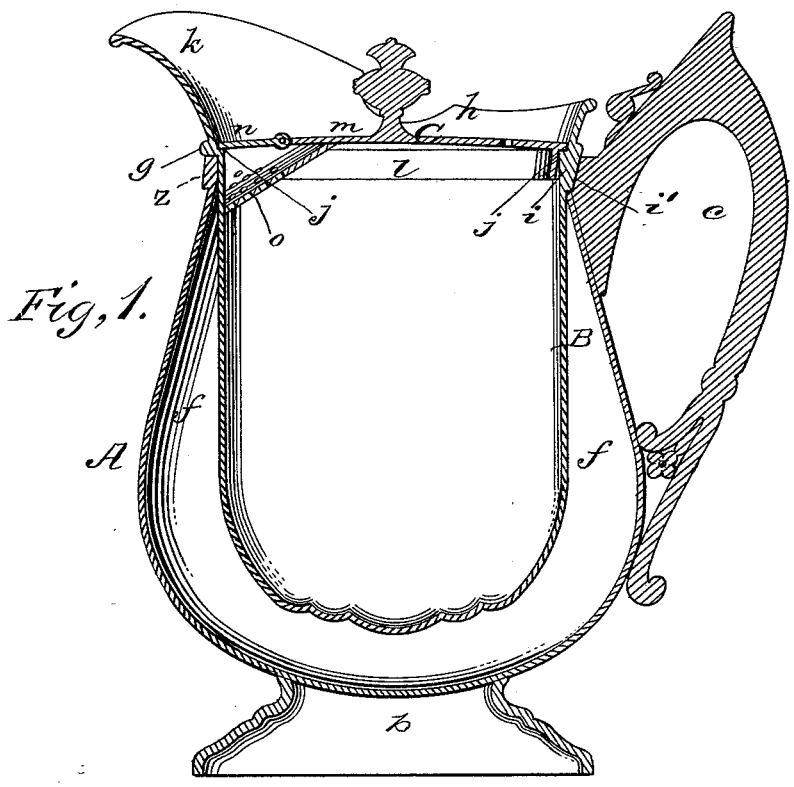
Figure 2:
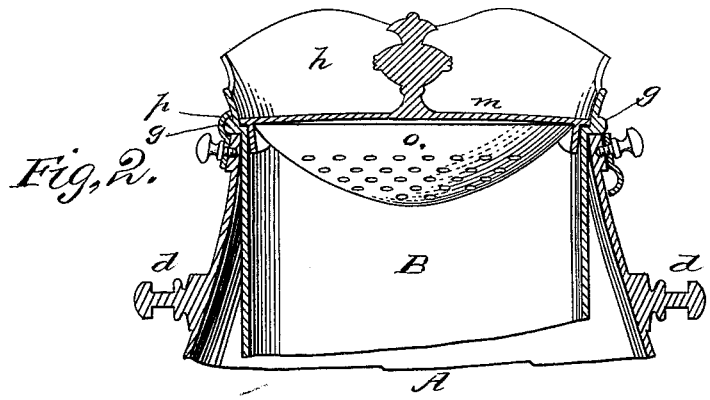

Figure 1 of the drawings is a representation of a vertical central section of my improved pitcher; and Fig. 2 is a similar section taken at right angles to the line of the section, Fig. 1.

This invention has relation to improvements in double-walled pitchers designed to contain liquids or semi-liquid substances; and the nature of the invention consists in a pitcher constructed and arranged substantially as hereinafter shown and described.

In the annexed drawings, the letter A designates the exterior wall of the pitcher, the body of which is without a spout, is supported by a base-flange, $b$, and has attached thereto the handle $c$ and trunnions $d$, by means of which it is suspended on a stand. The upper edge of the pitcher-body is straight and horizontal, and is formed by a re-enforcement or band, $z$.

B is the inner wall of the pitcher, having a cylindrical body of less diameter than the body of the exterior wall, and forming therewith an air-space, $f$. At the upper edge of the cylindrical body is a projecting annular rib, $g$, above which is a slightly-flared lip, $h$, terminating in a spout, $k$. The inner wall of the pitcher is readily introduced into the exterior wall thereof, and is supported therein by the rib $g$, that rests upon the upper edge of the said exterior wall, as shown in Fig. 2, with the lip and spout projecting above the same.

The inner wall may be made of metal, with or without a lining of porcelain, glass, or any description of earthenware; and it is prevented from falling out of the exterior wall, when the pitcher is tilted, by means of spring or other catches $p$, that engage the annular rib or bead $g$ aforesaid. It is provided, just under the rib, with a beveled stud, $i$, that engages a corresponding recess, $i'$, in the interior wall of the casing, thus preventing the inner wall from rotating, and keeping the spout and handle in their proper relation to each other.

Inside of the inner wall, on or about on a level with the rib $g$, is an annular ledge, $j$, upon which the lid C, closing the liquid-receptacle, is designed to rest, being held in place by the frictional contact of its flange $l$ with the contiguous face of the inner wall. This lid is composed of a body, $m$, having a segmental valve, $n$, hinged thereto, and bearing at its free edge on the ledge aforesaid. A strainer, $o$, is arranged in an inclined position below said valve, secured to the body of the lid and resting against the side of receptacle. This valve swings freely on its hinge when the pitcher is tilted, thus allowing the contents to flow out, while any foreign matter is retained by the sieve or strainer.

It will be observed that the lip of the interior wall or receptacle forms a continuation, to all intents and purposes, of the outer wall, which causes the pitcher to present a very ornamental appearance, besides considerably diminishing its cost. It will also be seen that the inner wall, B, constituting the water-receptacle, may be lifted out bodily without removing the lid and allowing the cold air to escape.

What I claim as new, and desire to secure by Letters Patent, is—

1. The combination, with the exterior wall, A, having the horizontal upper edge, of the removable inner wall, forming the receptacle, and having the rib $g$, the lip $h$, and spout $k$, the lid C, within said receptacle, and the adjustable spring-catches $p$ on the exterior wall and engaging the rib $g$, substantially as specified.

2. The removable inner receptacle, B, of cylindrical form, below the bearing-band $g$, and flaring above said band to form the spout and lip, in combination with the outer vessel, A, having the band $z$, adapted to receive the inner vessel, B, substantially as specified.

3. The lid or cover C, having the inclined perforated flange $o$, extending from its middle portion forward, and the hinged section $n$, engaging the ledge $j$, and forming a part of the cover and opening above the said inclined perforated flange, substantially as specified.

4. The combination, with the outer vessel, A, having the band $z$, and the inner detachable vessel, having the lower cylindrical portion, the bead $g$, and above the same the spout and lip, of the side catch on the band $z$, engaging with said bead, substantially as specified.

5. In a double-walled pitcher, the combination, with the wall A and the removable receptacle B, having the lip $h$, spout $k$, inside ledge $j$, and lid C, resting on the ledge inside of the lip, the valve $n$, the strainer $o$, and flange $l$, holding by friction against said ledge, substantially as specified.

In testimony that I claim the above I have hereunto subscribed my name in the presence of two witnesses.

HENRY BERRY.

Witnesses:
C. A. BURR,
C. S. DE FOREST.